(12) United States Patent
Nikara et al.

(10) Patent No.: US 9,892,047 B2
(45) Date of Patent: Feb. 13, 2018

(54) MULTI-CHANNEL CACHE MEMORY (75) Inventors: Jari Nikara, Lempaala (FI); Eero Aho, Tampere (FI); Kimmo Kuusilinna, Tampere (FI)

(73) Assignee: Provenance Asset Group LLC, Essex, CT (US)

( * ) Notice: Subject to any disclaimer, the term of this patent is extended or adjusted under 35 U.S.C. 154(b) by 831 days.

(21) Appl. No.: 13/496,649

(22) PCT Filed: Sep. 17, 2009

(86) PCT No.: PCT/EP2009/062076
§ 371 (c)(1),
(2), (4) Date: Apr. 13, 2012

(87) PCT Pub. No.: WO2011/032593
PCT Pub. Date: Mar. 24, 2011

(65) Prior Publication Data
US 2012/0198158 A1    Aug. 2, 2012

(51) Int. Cl.
*G06F 12/0842* (2016.01)
*G06F 12/08* (2016.01)
*G06F 12/0846* (2016.01)
*G06F 12/084* (2016.01)
*G06F 12/0844* (2016.01)

(52) U.S. Cl.
CPC ........ *G06F 12/0846* (2013.01); *G06F 12/084* (2013.01); *G06F 12/0842* (2013.01); *G06F 12/0844* (2013.01)

(58) Field of Classification Search
USPC .................................................. 711/118, 113
See application file for complete search history.

(56) References Cited

U.S. PATENT DOCUMENTS 6,457,087 B1 *  9/2002  Fu .................... G06F 12/0813
                                                       710/305
6,604,174 B1 *  8/2003  Dean ................ G06F 12/0844
                                                       711/118

(Continued)

FOREIGN PATENT DOCUMENTS

CN          1558331 A       12/2004
DE       196 43 688 A1       5/1998
JP          5-158793          6/1993

OTHER PUBLICATIONS

"The Basics of Caches", 1988, Webster's New World Dictionary of the American Language, Third College Edition, pp. 545-553.

(Continued)

*Primary Examiner* — Jared Rutz
*Assistant Examiner* — Marwan Ayash
(74) *Attorney, Agent, or Firm* — Harrington & Smith (57) ABSTRACT

A cache memory including: a plurality of parallel input ports configured to receive, in parallel, memory access requests wherein each parallel input port is operable to receive a memory access request for any one of a plurality of processing units; and a plurality of cache blocks wherein each cache block is configured to receive memory access requests from a unique one of the plurality of input ports such that there is a one-to-one mapping between the plurality of parallel input ports and the plurality of cache blocks and wherein each of the plurality of cache blocks is configured to serve a unique portion of an address space of the memory.

14 Claims, 4 Drawing Sheets

(56) References Cited

U.S. PATENT DOCUMENTS

| | | | |
|---|---|---|---|
| 8,661,200 B2* | 2/2014 | Nikara et al. .................. 711/129 |
| 8,677,081 B1* | 3/2014 | Wentzlaff ............ G06F 12/0811 |
| | | | 711/130 |
| 2003/0151608 A1* | 8/2003 | Chung et al. .................. 345/506 |
| 2003/0167379 A1 | 9/2003 | Soltis, Jr. ....................... 711/119 |
| 2004/0078518 A1* | 4/2004 | Kuwata ............... G06F 12/0873 |
| | | | 711/113 |
| 2004/0111585 A1* | 6/2004 | Noyes ................. G06F 12/1027 |
| | | | 711/206 |
| 2004/0221112 A1* | 11/2004 | Greenfield .......... G06F 12/0813 |
| | | | 711/148 |
| 2004/0225840 A1* | 11/2004 | O'Connor et al. ............ 711/122 |
| 2006/0117141 A1 | 6/2006 | Rakvic et al. ................. 711/119 |
| 2006/0149924 A1* | 7/2006 | Dwyer ................ G06F 9/30036 |
| | | | 712/22 |
| 2009/0063775 A1* | 3/2009 | Molema ................. A61C 17/36 |
| | | | 711/129 |
| 2011/0197028 A1* | 8/2011 | Nikara .................. G06F 12/084 |
| | | | 711/118 |
| 2011/0197031 A1* | 8/2011 | Aho ..................... G06F 12/0844 |
| | | | 711/130 |
| 2014/0052961 A1* | 2/2014 | Vorbach ................ G06F 9/3017 |
| | | | 712/33 |
| 2016/0259644 A1* | 9/2016 | Brandt ................ G06F 9/30145 |
| 2017/0123682 A1* | 5/2017 | Sinclair ................. G06F 3/0611 |

OTHER PUBLICATIONS

Sohn, A., "CS650 Computer Architecture, lecture 8, Memory Hierarchy—Cache Memory", Nov. 2, 2004, New Jersey Institute of Technology, 12 pgs.

Ronner, K., et al., "Architecture and Applications of the HiPAR Video signal Processor", © 1996 IEEE, pp. 56-66.

\* cited by examiner

MULTI-CHANNEL CACHE MEMORY

FIELD OF THE INVENTION

Embodiments of the present invention relate to cache memory. In particular, they relate to apparatus such as cache memory, methods and systems.

BACKGROUND TO THE INVENTION

Processing apparatus typically comprise one or more processing units and a memory. Accesses to the memory may be slower than desired. This may be because there is contention between parallel accesses and/or because the memory storage used has a fundamental limit on its access speed.

A cache memory may intervene between a processing unit and the memory. The cache memory is typically smaller than the memory and may use memory storage that has a faster access speed.

Multiple processing units may be arranged with a cache available for each processing unit. Each processing unit may have its own dedicated cache. Alternatively a shared cache memory unit may comprise separate caches with the allocation of the caches between processing units determined by an integrated crossbar.

It is possible for processing units to read/write the same word. It is therefore important that if a block for a particular memory address is updated in one cache that the blocks for that particular memory address in other caches (should the blocks exist) are also updated or invalidated. The caches have specific circuitry for maintaining coherency between the caches. Therefore, although the caches may be physically or logically separated they are not isolated because of the inter communication required for coherency.

BRIEF DESCRIPTION OF VARIOUS EMBODIMENTS OF THE INVENTION

According to various, but not necessarily all, embodiments of the invention there is provided a cache memory comprising: a plurality of parallel input ports configured to receive, in parallel, memory access requests wherein each parallel input port is operable to receive a memory access request for any one of a plurality of processing units; and a plurality of cache blocks wherein each cache block is configured to receive memory access requests from a unique one of the plurality of input ports such that there is a one-to-one mapping between the plurality of parallel input ports and the plurality of cache blocks and wherein each of the plurality of cache blocks is configured to serve a unique portion of an address space of the memory.

According to various, but not necessarily all, embodiments of the invention there is provided a method comprising: associating each one of a plurality of defined portions of the address space of a memory with a plurality of different cache channels; receiving memory access requests where each memory access request comprises a memory address; identifying for each received memory access request the particular one of the plurality of defined portions of the address space of the memory that includes the memory address comprised in the received memory access request; and sending each memory access request to the cache channel associated with the identified portion of the address space of the memory.

According to various, but not necessarily all, embodiments of the invention there is provided circuitry comprising: output interfaces each of which is configured to send a memory access request to a cache channel; input interfaces configured to receive memory access requests for a plurality of processing units where each memory access request comprises a memory address; and control circuitry configured to select for each received memory access request an output interface associated with a portion of the address space of the memory that includes the memory address comprised in the received memory access request.

According to various, but not necessarily all, embodiments of the invention there is provided a method comprising: receiving memory access requests for a plurality of processing units; sending a received first memory access request that comprises a first memory address to a first cache channel if the first memory address is from a defined first portion of the address space of the memory but not if the first memory address is from a portion of the address space of the memory other than the defined first portion of the address space of the memory; and sending the first memory access request to a second cache channel if the first memory address is from a defined second portion of the memory but not if the first memory address is from a portion of the address space of the memory other than the defined second portion of the address space of the memory; sending a received second memory access request that comprises a second memory address to a first cache channel if the second memory address is from a defined first portion of the address space of the memory but not if the second memory address is from a portion of the address space of the memory other than the defined first portion of the address space of the memory; and sending the second memory access request to a second cache channel if the second memory address is from a defined second portion of the memory but not if the second memory address is from a portion of the address space of the memory other than the defined second portion of the address space of the memory.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
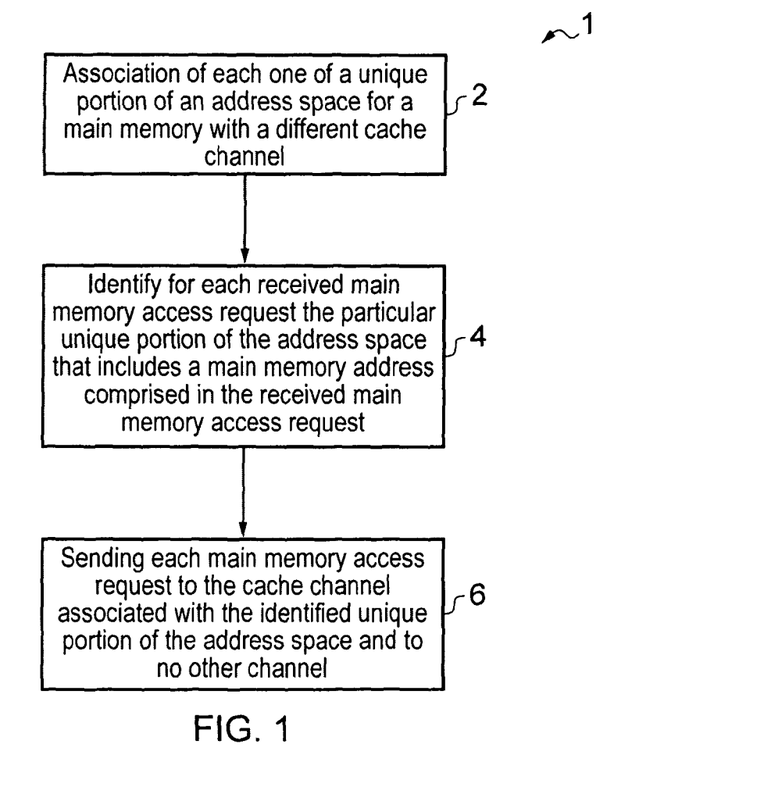
FIG. 1 schematically illustrates a method relating to the use of multiple cache channels for a memory.

FIG. 1 schematically illustrates a method 1 relating to the use of a multi-channel cache memory for a memory. The memory has an address space that is typically greater than the capacity of the multi-channel cache memory. The memory is accessed using memory access requests, each of which comprises a memory address.

Figure 2A:
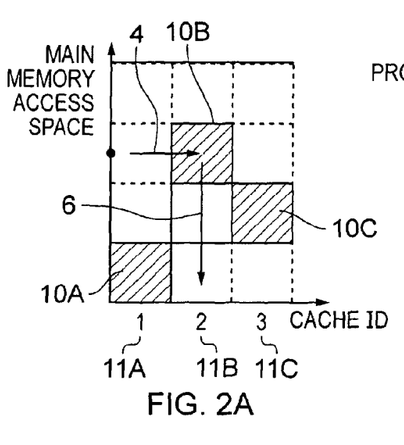
FIG. 2A illustrates that the allocation of a cache to a memory access request is dependent on the memory address included in the memory access.

FIG. 2A schematically illustrates how the address space of the memory may be separated into a plurality of defined portions 10A, 10B, 10C. In this particular example, the portions 10A, 10B, 10C are non-overlapping portions. Each of these portions 10A, 10B, 10C shall be referred to as unique address spaces 10 because each of them, at any particular moment in time, is a unique usable portion of the address space of the memory that includes one or more addresses that are not included, for use at that particular moment in time, in any of the other defined portions.

Referring back to block 2 of FIG. 1, each of the unique address spaces 10 is associated with a different cache channel 11A, 11B, 11C. This association is illustrated graphically in FIG. 2A, where each unique address spaces 10A, 10B, 10C is associated with only one of the cache channels 11A, 11B, 11C.

The association will be recorded in suitable storage for future use. The association may be direct, for example, a cache block 20 (FIG. 4) used for a cache channel may be explicitly identified. The association may be indirect, for example, an output interface that serves only a particular cache block may be explicitly identified.

Next at block 4 in FIG. 1, each memory access request is processed. The memory address, from a received memory access request, is used to identify the unique address space 10 that includes that address.

Next at block 6, the memory access request is sent to the cache channel associated with the identified unique address space and to no other cache channel.

Thus, referring to FIG. 2A, if a received memory access request includes a memory address 11, the defined unique address space 10B that includes the memory address 11 is identified. From the association, the particular cache channel 11B associated with the identified unique address space portion 10B is identified and allocated for use. The memory access request is then sent to the associated cache channel 11B.

It should be noted, from FIG. 2A, that it is not necessary for the whole of the memory address space to be spanned by the defined unique address spaces 10.

It should also be noted, that although the unique address spaces 10 are illustrated in FIG. 2A as including a consecutive series of addresses in the address space of the memory this is not necessary. The unique address spaces may be defined in any appropriate way so long as they remain unique. For example, any N bits (adjacent or not adjacent) of a memory address may be used to define $2^N$ non-overlapping address spaces.

In some embodiments, the memory access requests may be in respect of a single processing unit.

Figure 2B:
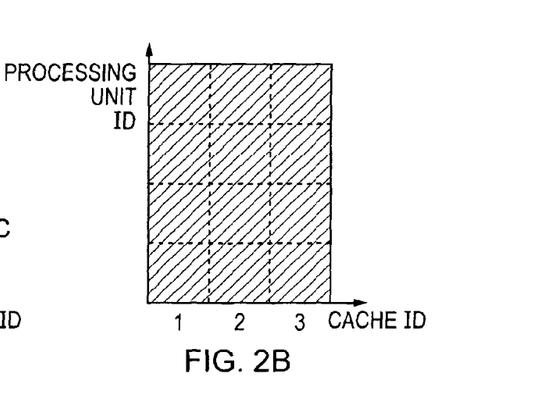
FIG. 2B illustrates that the allocation of a cache to a memory access request is independent of the identify of the processing unit in respect of which the memory access request is made.

In other embodiments, the memory access requests may be in respect of multiple processing units. FIG. 2B illustrates that the allocation of a cache channel 11 to a memory access request is independent of the identity of the processing unit in respect of which the memory access request is made, whereas FIG. 2A illustrates that the allocation of a cache channel 11 to a memory access request is dependent on the memory address included in the memory access request and the defined unique address spaces 10.

In some embodiments, the memory access requests may originate from the processing units that they are in respect of, whereas in other embodiments the memory access requests may originate at circuitry other than the processing units that they are in respect of. The response to a memory access request is returned to the processing unit that the memory access request is for.

Figure 3:
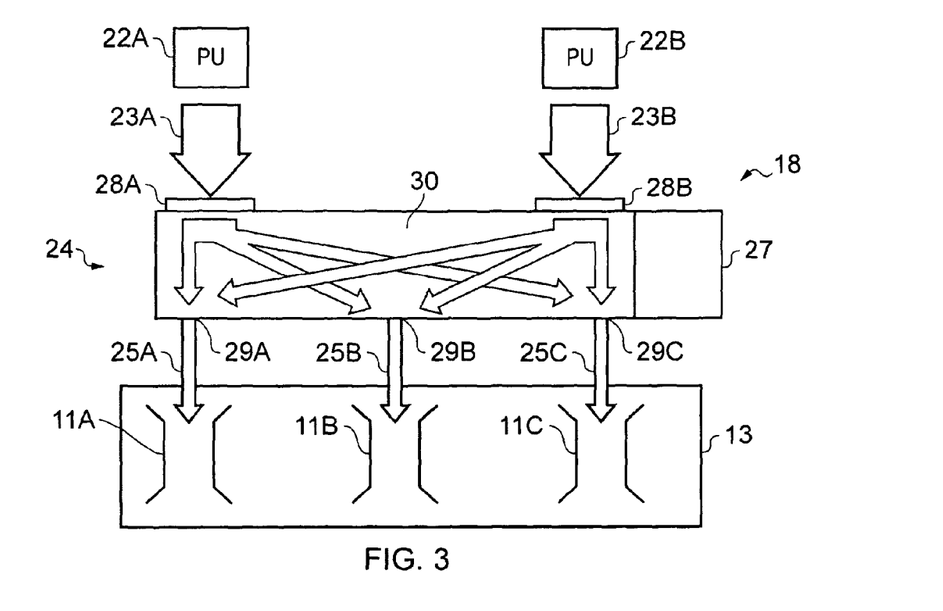
FIG. 3 schematically illustrates the functional components of a system suitable for performing the method of FIG. 1.

FIG. 3 schematically illustrates the functional components of a system 18 suitable for performing the method of FIG. 1.

The system 18 comprises: a plurality of cache channels 11A, 11B, 11C; arbitration circuitry 24; and multiple processing units 22A, 22B. Although a particular number of cache channels 11 are illustrated this is only an example, there may be M cache channels where M>1. Although a particular number of processing units 22 are illustrated this is only an example, there may be P processing units where P is greater than or equal to 1.

In this embodiment, the first processing unit 22A is configured to provide first memory access requests 23A to the arbitration circuitry 24. The second processing unit 22B is configured to provide second memory access requests 23B to the arbitration circuitry 24. Each processing unit 22 can provide memory access requests to all of the cache channels 11A, 11B, 11C via the arbitration circuitry 24.

Each memory access request 23 comprises a memory address. The memory access requests 23 may be described as having a large bandwidth as the included memory addresses may be any addresses from a large portion, perhaps the whole, of the memory address space. The wide band nature of the memory access requests 23 at this stage is illustrated in the Figure by using a broad arrow to represent the requests.

The arbitration circuitry 24 directs a received wideband memory access request 23, as a narrowband memory access request 25 to the appropriate cache channel based upon a memory address comprised in the request. Each cache channel 11 receives only the memory access requests 25 that include a memory address that lies within the unique address space 10 associated with the cache channel 11.

The memory address provided to a cache channel 11 therefore is a narrowband memory request 25. The narrowband nature of the memory access requests 25 at this stage is illustrated in the Figure by using a narrow arrow to represent the requests.

Each of the caches channels 11A, 11B, 11C serves a different unique address space 10A, 10B, 10C. A cache channel 11 receives only those memory access requests that comprise a memory address that falls within the unique address space 10 associated with that cache channel. Memory access requests (relating to different unique address spaces) are received and processed by different cache channels in parallel, that is, for example, during the same clock cycle.

However, as a single cache channel 11 may simultaneously receive memory access requests from multiple different processing units, the cache channel will require buffering of memory access requests.

All of the cache channels 11A, 11B, 11C may be comprised within a single multi-channel unit or comprised within any combination of single-channel units only or multi-channel units only or both single-channel units and multi-channels units. The units may be distributed through the system 18 and need not be located at the same place.

In this example, the arbitration circuitry 24 comprises input interfaces 28, control circuitry 30 and output interfaces 29.

In this particular example, the arbitration circuitry 24 comprises local data storage 27, In other implementation storage 27 may be in another component. The data storage 27 is any suitable storage facility which may be local or remote. It is used to store a data structure that associates each one of a plurality of defined, unique address spaces 10 with, in this example, a particular one of a plurality of different output interfaces 29.

In other implementations, the association between each one of a plurality of defined, unique address spaces 10 with a cache channel may be achieved in other ways.

The input interface 28 is configured to receive memory access requests 23. In this example there are two input interfaces 28A, 28B. A first input interface 28A receives memory access requests 23A for a first processing unit 22A. A second input interface 28B receives memory access requests 23B for a second processing unit 22B.

Each of the output interfaces 29 is connected to only a respective single cache channel 11. Each cache channel 11 is connected to only a respective single output interface 29. That is there is a one-to-one mapping between the output interfaces 29 and the cache channels 11.

The control circuitry 30 is configured to route received memory access requests 23 to appropriate output interfaces 29. The control circuitry 30 is configured to identify, as a target address, the memory address comprised in a received memory access request. The control circuitry 30 is configured to use the data storage 27 to identify, as a target unique address space, the unique address space 10 that includes the target address. The control circuitry 30 is configured to access the data storage 27 and select the output interface 29 associated with the target unique address space in the data storage 27. The selected output interface 29 is controlled to send the memory access request 25 to one cache channel 11 and to no other cache channel 11.

In this example, the selected access request may be for any one of a plurality of processing units and the selection of an output interface 29 is independent of the identity of the processing unit for which the memory access request was made.

In this example, the control circuitry 30 is configured to process in parallel multiple memory access requests 23 and select separately, in parallel, different output interfaces 29.

The arbitration circuitry 24 may comprise buffers for each output interface 29. A buffer would then buffer memory access requests 25 for a particular output interface/cache channel.

The operation of the arbitration circuitry 24 may be described as: receiving memory access requests 23 for a plurality of processing units 22; sending a received first memory access request 23A that comprises a first memory address to only a first cache channel 11A if the first memory address is from a defined first portion 10A of the address space of the memory but not if the first memory address is from a portion 10B or 10C of the address space of the memory other than the defined first portion 10A of the address space of the memory; and sending the first memory access request 23A to only a second cache channel 11B if the first memory address is from a defined second portion 10B of the address space of the memory but not if the first memory address is from a portion 10A or 10C of the address space of the memory other than the defined second portion 10B of the address space of the memory; sending a received second memory access request 23B that comprises a second memory address to only a first cache channel 10A if the second memory address is from a defined first portion 10A of the address space of the memory but not if the second memory address is from a portion 10B or 10C of the address space of the memory other than the defined first portion 10A of the address space of the memory; and sending the second memory access request 23B to only a second cache channel 11B if the second memory address is from a defined second portion 10B of the memory but not if the second memory address is from a portion 10A or 10C of the address space of the memory other than the defined second portion 10B of the address space of the memory.

Implementation of arbitration circuitry 24 and, in particular the control circuitry 30, can be in hardware alone, have certain aspects in software including firmware alone or can be a combination of hardware and software (including firmware).

Implementation of arbitration circuitry 24 and, in particular the control circuitry 30, may be implemented using instructions that enable hardware functionality, for example, by using executable computer program instructions in a general-purpose or special-purpose processor that may be stored on a computer readable storage medium (disk, memory etc) to be executed by such a processor.

One or more memory storages 13 may be used to provide cache blocks for the cache channels. In some, implementations each cache channel 11B may have its own cache block that is used to service memory access request sent to that cache channel. The cache blocks may be logically or physically separated from other cache blocks. The cache blocks, if logically defined, may be reconfigured by moving the logical boundary between blocks.

Figure 4:
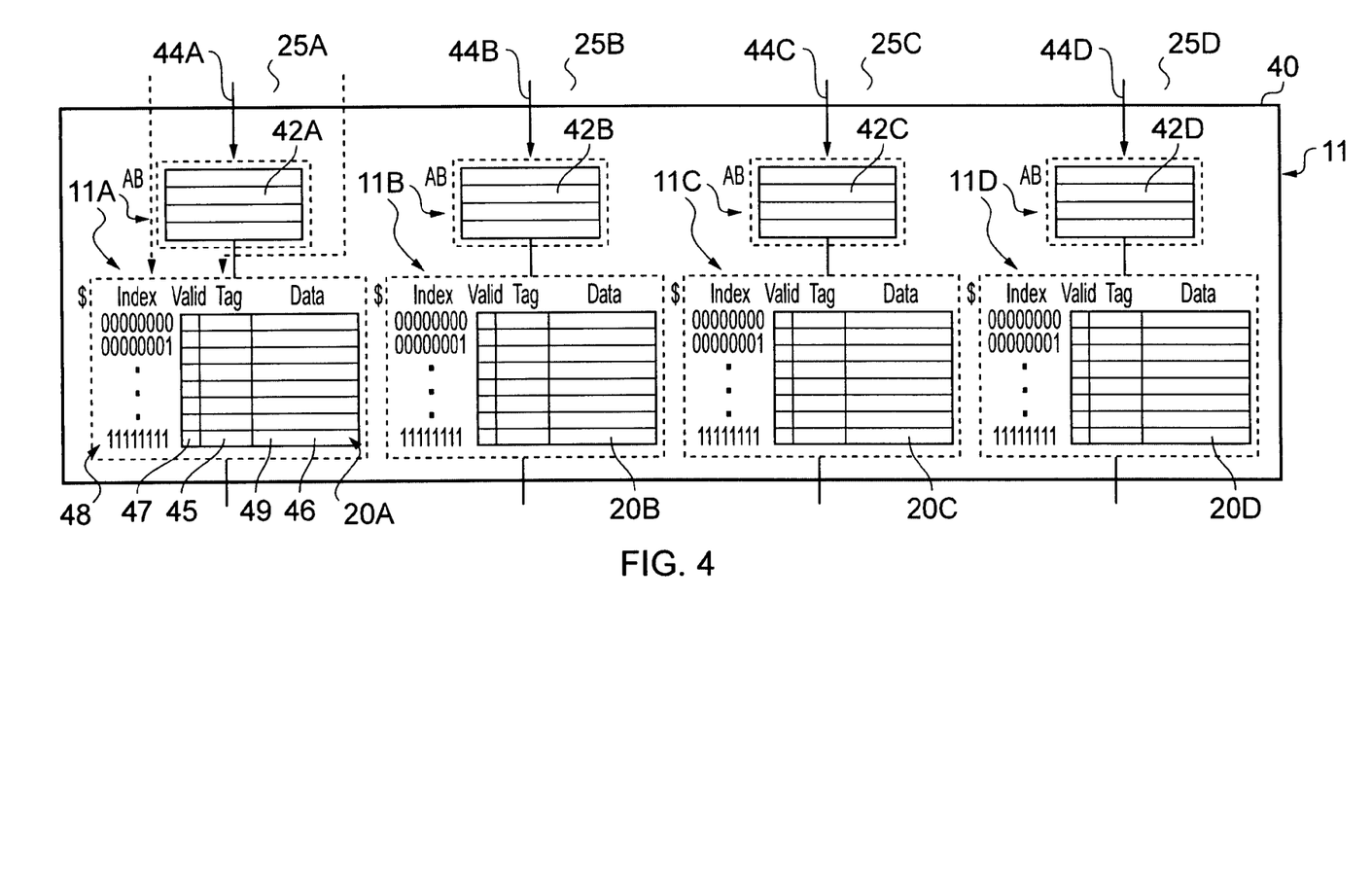
FIG. 4 schematically illustrates a multi-channel cache memory unit.

FIG. 4 schematically illustrates one of many possible implementations of a multi-channel cache memory unit 40. The multi-channel cache memory unit 40, in this example, comprises: a plurality of parallel input ports 44A, 44B, 44C, 44D and a plurality of cache blocks 20A, 20B, 20C, 20D.

The cache bocks 20A, 20B, 20C are isolated as indicated by respective references 26A, 26B, 26C. 'Isolation' may be, for example, 'coherency isolation' where a cache does not communicate with the other caches for the purposes of data coherency. 'Isolation' may be, for example, 'complete isolation' where a cache does not communicate with the other caches for any purpose. The isolation configures each of the plurality of caches to serve a specified address space of the memory. As the plurality of caches are not configured to serve any shared address space of the memory, coherency circuitry for maintaining coherency between cache blocks is not required and is absent.

The plurality of parallel input ports 44A, 44B, 44C, 44D are configured to receive, in parallel, respective memory access requests 25A, 25B, 25C and 25D. Each parallel input port 44$i$ receives only memory access requests for a single address space 10.

In this example, each of the plurality of parallel input ports 44 is shared by the processing units 22 (but not by the cache blocks 20) and configured to receive memory access requests for all the processing units 22. Each of the plurality of cache blocks 20 are arranged in parallel and as a combination are configured to process in parallel multiple memory access requests from multiple different processing units.

Each of the plurality of cache blocks comprises a multiplicity of entries 49 In the illustrated example, each entry 49 comprises a tag field 45 and at least one data word 46. In this example, each entry also comprises a validity bit field 47. Each entry 49 is referenced by a look-up index 48. It should be appreciated that this is only one example, implementation.

The operation of a cache block 20 is well documented in available textbooks and will not be discussed in detail. For completeness, however, a brief overview of will be given of how a cache block 20 handles a memory (read) access request.

An index portion of the memory address included in the received memory access request 25 is used to access the entry 49 referenced by that index.

A tag portion of the received memory address is used to verify the tag field 45 of the accessed entry 49.

Successful verification results in a 'hit' and the generation of a hit response comprising the word 46 from the accessed entry 49.

Unsuccessful verification results in a 'miss', a read access to the memory and an update to the cache.

In the illustrated example, each cache block 20 has an associated dedicated buffer 42 that buffers received, but not yet handled, memory access requests for the cache channel. The buffers are optional.

The cache memory unit 40 may, for example, be provided as a module. As used here 'module' refers to a unit or apparatus that excludes certain parts/components that would be added by an end manufacturer or a user.

Figure 5:
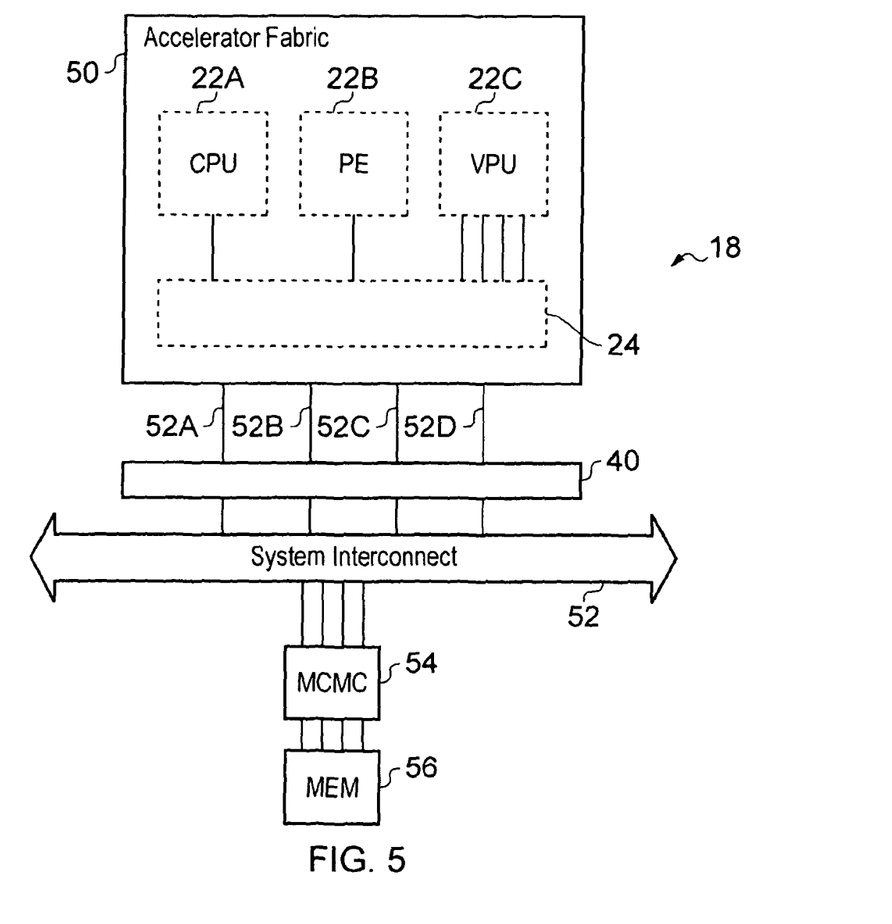
FIG. 5 schematically illustrates one example of a physical implementation of the system.

FIG. 5 schematically illustrates one example of a physical implementation of the system 18 previously described with reference to FIG. 3.

In this example, the multiple processing units 22A, 22B, 22C are part of an accelerator 50 such as, for example, a graphics accelerator. The accelerator is optimized for efficient processing.

In this example, the arbitration circuitry 24 is an integral part of the accelerator 50.

The accelerator 50 has a number of parallel interconnects 52 between the arbitration circuitry 24 and the multi-channel cache. Each interconnect connects a single output interface 29 of the arbitration circuitry 24 with a single cache input port 44.

The multi-cache unit 40 is connected to the memory 56 via a system interconnect 52 and a memory controller 54.

The processing units 22 in this example include a general purpose processing unit (CPU) 22A, an application specific programming element (PE) 22B and a vector processing unit (VPU) 22C. The CPU 22A and the PE 22B generate their own memory access requests. The VPU 22C is a single instruction, multiple data (SIMD) type of processing element and, in this example, requires four parallel data words. Each processing unit executes its own tasks and accesses individually the memory 56.

Although FIG. 5 illustrates the arbitration circuitry 24 as being a part of the accelerator 50 it should be appreciated that the arbitration circuitry may, in some embodiments be a part of the multi-cache unit 40. In other embodiments, the arbitration circuitry may be a part of the processing units, the accelerator or the multi-cache unit 40. In still further embodiments, the arbitration circuitry may be distributed over one or more of the previously mentioned locations.

The system 18 in this embodiment, and also in previously described embodiments, may perform a number of functions including:

The arbitration circuitry 24 may re-define the unique address spaces and change the association recorded in storage 27. As a consequence, each cache block 20 may become associated with a different unique address space 10.

The control circuitry 30 of the arbitration circuitry 24 is configured to access the data storage 27 to re-define the unique address spaces and configured to generate at least one control signal for the cache blocks 20 as a consequence.

The arbitration circuitry 24 may re-define the unique address spaces after detecting a particular predetermined access pattern to the memory by a plurality of processing units 22. For example, the arbitration circuitry 24 may identify a predetermined access pattern to the memory by a plurality of processing units and then re-define the unique address spaces 10 based on that identification. The redefinition of the unique address spaces may enable more efficient use of the cache channels by increasing the percentage of hits. For example, the redefinition may increase the probability that all of the cache channels are successfully accessed in each cycle. The cache memory unit 40 is configured to respond to the control signal by setting all of the validity bit fields 47 in the cache memory unit 40 to invalid. A single global control signal may be used for all the caches 20 or a separate control signal may be used for each cache 20. In some embodiments, only portions of the unique address spaces 10 may be redefined and the separated control signals may be used to selectively set validity bits in the cache memory unit 40 to invalid.

Figure 6A:
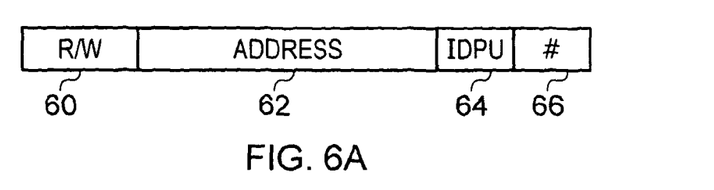
FIG. 6A illustrates an example of a memory access request including one or more identification references.

Referring to FIG. 6A an example of one example implementation of a memory access request 23 includes a read/write bit 60 which identifies if the access is for reading or for writing, an address field 62 which includes a memory address, and one or more identification references. In the illustrated example, a memory access is for a particular processing unit 22 and the first identification reference 64 identifies that processing unit and a second identification reference 66 orders memory access requests for the identified processing unit.

Figure 6B:
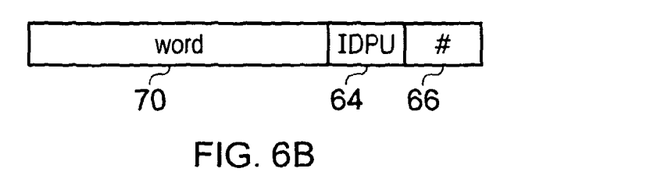
FIG. 6B illustrates an example of a typical response following a read access.

When the cache block 20 receives a memory access request 25 and generates a response 70 following a cache look-up, the response includes the identification reference(s) received in the memory access request. FIG. 6B illustrates an example of a typical response 70 following a successful read access. The response 70 includes the accessed word 46 and also the first identification reference 64 and the second identification reference 66.

The first identification reference 64 may enable routing of the response 70 to the particular processing unit 22 identified by the first identification reference 64.

The second identification reference 66 may enable the ordering or re-ordering of responses 70 for a processing unit.

Various components may have been described as connected in the preceding paragraphs. It should be appreciated that they may instead be operationally coupled and any number or combination of intervening elements can exist (including no intervening elements)

Reference has been made to various examples in the preceding description. It should be understood that reference to an example implies that alternative, but not necessarily explicitly disclosed implementations can be used.

The blocks illustrated in FIG. 1 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A cache memory comprising:
   a plurality of parallel input ports configured to receive, in parallel, memory access requests for a memory served by the cache memory, wherein each parallel input port is configured to receive a memory access request for any one of a plurality of processing units; and
   a plurality of cache blocks wherein each cache block is configured to receive memory access requests from a unique one of the plurality of input ports such that there is a one-to-one mapping between the plurality of parallel input ports and the plurality of cache blocks and wherein each of the plurality of cache blocks is associated with and configured to serve a unique portion of an address space of the memory, and
   wherein the unique portions of the address space of the memory served by the cache memory are redefinable to associate at least one of the plurality of cache blocks with a different unique portion of the address space of the memory,
   wherein a predetermined access pattern to the memory served by the cache memory by a plurality of processing units is identified, and
   wherein the portions of the address space of the memory served by the cache memory are redefined based on said identification to increase the probability that all of the cache channels are successfully accessed in each cycle.

2. A cache memory as claimed in claim 1, wherein each of the plurality of cache blocks is isolated from the other plurality of cache blocks, said isolation configuring each of the plurality of cache blocks to serve a unique portion of an address space of the memory and wherein each of the plurality of cache blocks is configured to receive only memory access requests that comprise a memory address that falls within a particular unique portion of the address space of the memory.

3. A cache memory as claimed in claim 1, wherein each of the plurality of cache blocks comprises entries comprising a tag field and at least one data word and comprising an interface for receiving a control signal that invalidates all of the entries of each of the plurality of cache blocks.

4. A cache memory as claimed in claim 1, further comprising a plurality of buffers wherein each of the plurality of cache blocks has an associated buffer for buffering memory access requests for the associated cache block.

5. A cache memory as claimed in claim 1, wherein each of the cache blocks comprises at least one validity bit field and the cache memory is configured to set all of the validity bit fields in the cache memory to invalid.

6. A cache memory as claimed in claim 1, wherein a received memory access request includes an identification reference and wherein the cache memory generates a response following a cache look-up using at least a portion of a memory address comprised in a memory request, that includes the received identification reference.

7. A method comprising:
   associating each one of a plurality of defined portions of the address space of a memory served by a cache memory with a plurality of different cache channels of the cache memory;
   receiving memory access requests where each memory access request comprises a memory address;
   identifying for each received memory access request the particular one of the plurality of defined portions of the address space of the memory that includes the memory address comprised in the received memory access request;
   sending each memory access request to the cache channel associated with the identified portion of the address space of the memory served by the cache memory; and
   re-defining the portions of the address space of the memory served by the cache memory to associate at least one of the plurality of cache channels with a different unique portion of the address space of the memory,
   and further comprising:
   identifying a predetermined access pattern to the memory served by the cache memory by a plurality of processing units; and
   re-defining the portions of the address space of the memory served by the cache memory based on said identification to increase the probability that all of the cache channels are successfully accessed in each cycle.

8. A method as claimed in claim 7, wherein memory access requests for multiple different processing units are sent to multiple different cache channels in parallel.

9. A method as claimed in claim 7, further comprising buffering memory access requests before sending them to a cache channel.

10. Circuitry comprising:
    output interfaces each of which is configured to send a memory access request for a memory served by a cache memory to a cache channel of the cache memory;
    input interfaces configured to receive memory access requests for a plurality of processing units where each memory access request comprises a memory address;
    control circuitry configured to select for each received memory access request an output interface associated with a unique portion of the address space of the memory that includes the memory address comprised in the received memory access request; and
    data storage configured to associate each one of a plurality of defined portions of the address space of the memory served by the cache memory with a particular different one of the output interfaces, wherein the control circuitry is configured to access the data storage to re-define the portions of the address space of the memory served by the cache memory to associate at least one of the output interfaces with a different unique portion of the address space of the memory,
    wherein the control circuitry is configured to identify a predetermined access pattern to the memory by a plurality of processing units; and configured to access the data storage to re-define the unique portions of the address space of the memory served by the cache memory based on the identification to increase the probability that all of the cache channels are successfully accessed in each cycle.

11. Circuitry as claimed in claim 10, further comprising a buffer for each output interface for buffering memory access requests before sending them to a cache memory.

12. A system comprising:
   circuitry as claimed in claim 10, and
   a plurality of cache blocks each of which is configured to receive a memory access request from only a respective single output interface of the circuitry.

13. A system as claimed in claim 12, further comprising a plurality of processing units each of which can provide memory access requests to any one of the plurality of cache blocks via the circuitry, wherein the received memory access requests at the circuitry are for the plurality of processing units, and wherein the selection of a cache block to which a memory access request is sent is independent of the identity of the processing unit for which the memory access request was made.

14. A method as claimed in claim 7, wherein memory access requests as a consequence of a single instruction, multiple data (SIMD) process are sent to multiple different cache channels in parallel.

\* \* \* \* \*